July 22, 1924.
C. RASMUSSEN
1,502,120
MACHINE FOR CUTTING RUBBER AND THE LIKE
Filed April 5, 1920    4 Sheets-Sheet 3
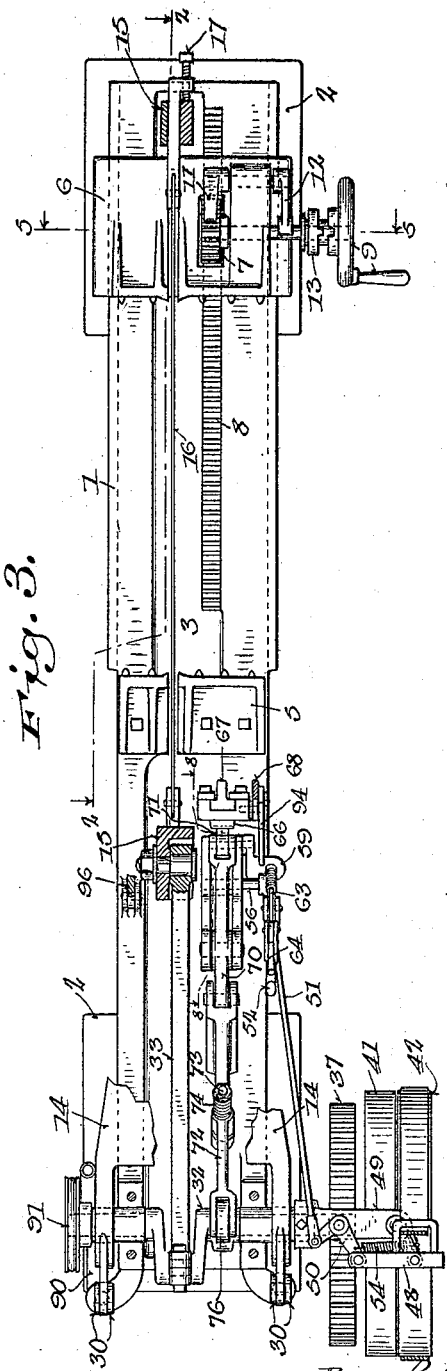
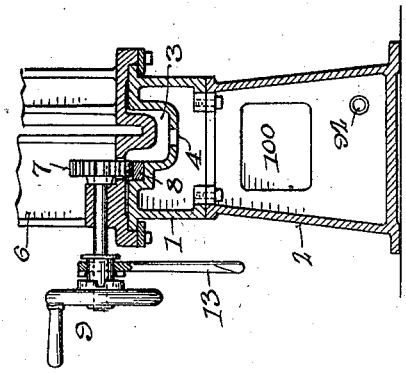
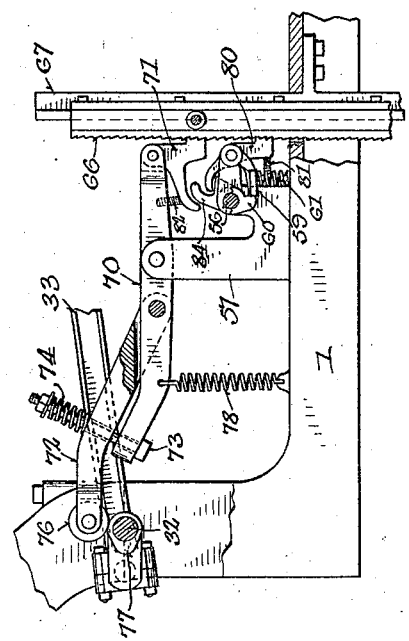
*Inventor:*
Charles Rasmussen
*By* Bottum, Bottum, Hudnall & Zecher
*Attorneys.*

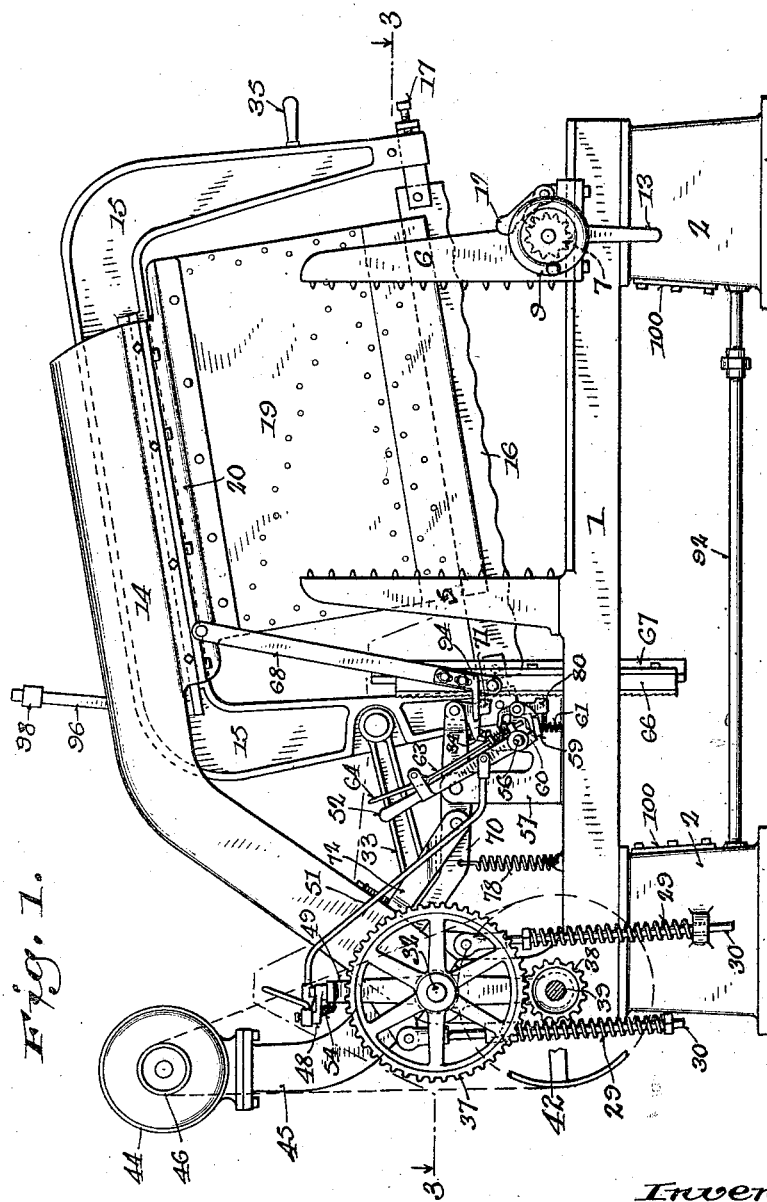

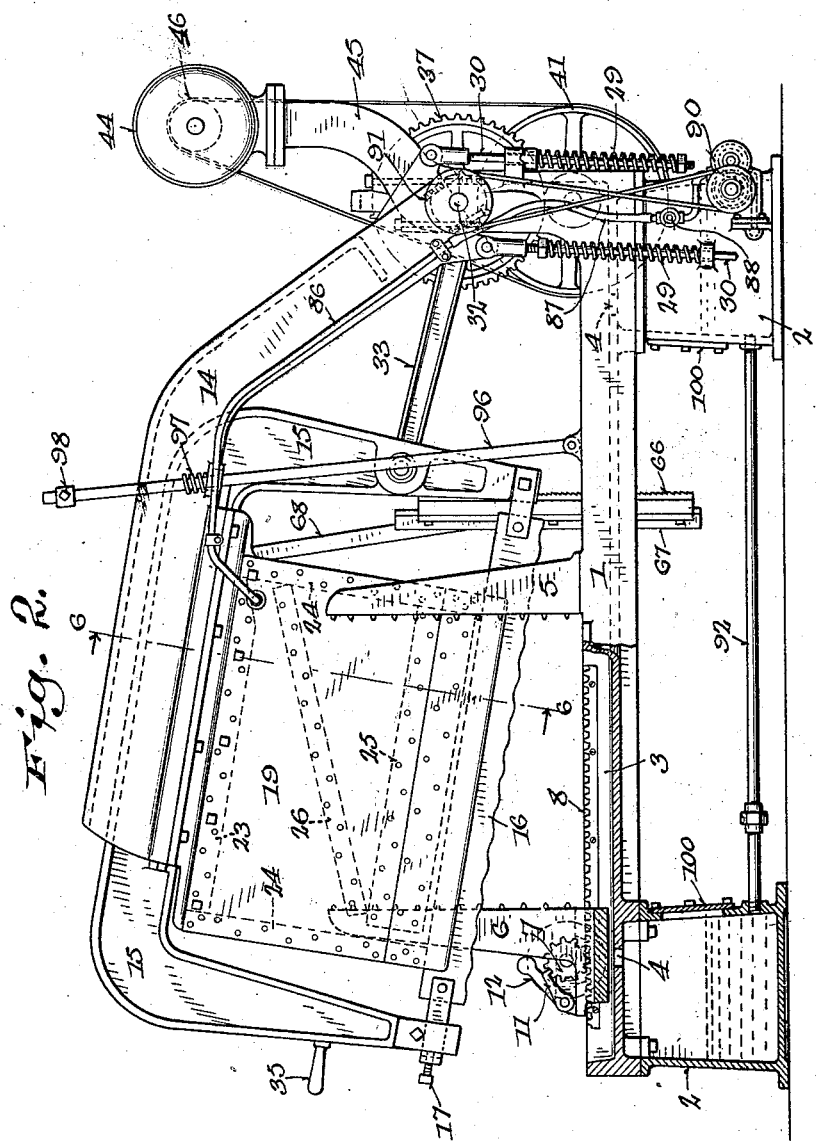

July 22, 1924.
C. RASMUSSEN
MACHINE FOR CUTTING RUBBER AND THE LIKE
Filed April 5, 1920  4 Sheets-Sheet 4
1,502,120
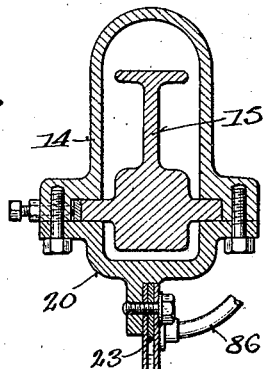
Fig. 6.
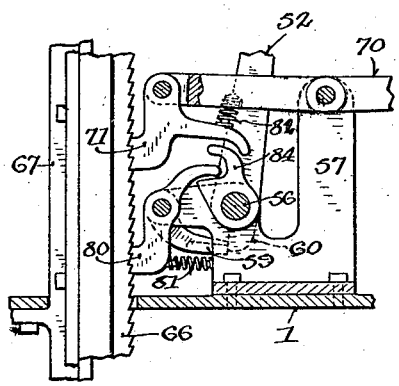
Fig. 8.
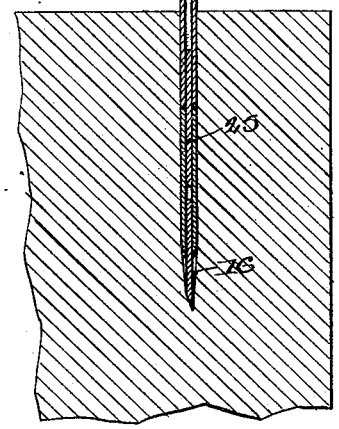
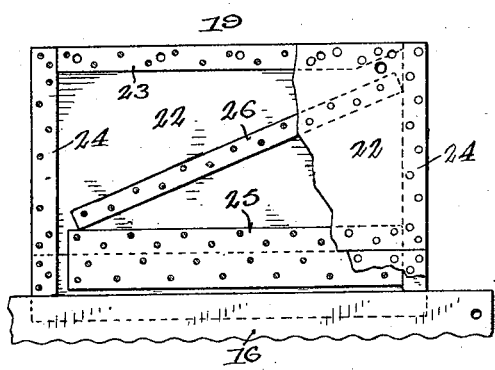
Fig. 7.
Inventor:
Charles Rasmussen,
By Bottum, Bottum, Hudnall & Escher
Attorneys.

Patented July 22, 1924.

1,502,120

UNITED STATES PATENT OFFICE.

CHARLES RASMUSSEN, OF RACINE, WISCONSIN, ASSIGNOR OF ONE-HALF TO RALPH T. INGALLS, OF RACINE, WISCONSIN.

MACHINE FOR CUTTING RUBBER AND THE LIKE.

Application filed April 5, 1920. Serial No. 371,437.

*To all whom it may concern:*

Be it known that I, CHARLES RASMUSSEN, a citizen of the United States, residing at Racine, in the county of Racine and State of Wisconsin, have invented certain new and useful Improvements in Machines for Cutting Rubber and the like, of which the following is a specification, reference being had to the accompanying drawing, forming a part thereof.

The main objects of this invention are to facilitate cutting rubber or the like; to prevent the rubber or the like from sticking to and interfering with the operation of the cutting blade; and to provide simple, effective and reliable mechanism for the purpose.

The basic principle and essential features of the invention, comprising means for feeding water or a lubricating liquid into the cut as it is being made by the cutting blade in rubber or the like and for spreading or deflecting the material away from the blade as the cut is made therein, and means for varying the relative positions of the blade and work by the movement of the one or the other to effect the cutting of the material, may be embodied in mechanism of widely varying design, construction and arrangement of parts.

In the accompanying drawing, illustrating a practical embodiment of the invention in a machine specially designed for cutting rubber in bales, bundles or masses, like characters designate the same parts in the several figures.

Figure 1 is a side elevation of the machine, the drive shaft being shown in cross section and the pulleys partially broken away; Fig. 2 is a reverse side elevation and partial vertical section on the line 2—2, Fig. 3; Fig. 3 is a plan view partly in horizontal section on the line 3—3, Fig. 1; Fig. 4 is an enlarged view similar to Fig. 1, of parts of the cutter actuating and feeding mechanism; Fig. 5 is a vertical cross section on the line 5—5, Fig. 3; Fig. 6 is an enlarged vertical cross section on the line 6—6, Fig. 2, of the cutter supporting arm, frame and blade with associated parts, illustrating the operation of the fountain and spreader in connection with a mass of rubber or the like; Fig. 7 is a broken detail view of the fountain and spreader in connection with a portion of the cutter blade; and Fig. 8 is an enlarged vertical section on the line 8—8, Fig. 3, showing parts of the cutter feeding mechanism as seen from the opposite side from that shown in Figs. 1 and 4.

Referring to Figs. 1, 2, 3 and 5, the machine comprises a frame consisting of a horizontal work supporting bed 1, mounted on hollow pedestals 2, which serve as a reservoir for a lubricating liquid such as water.

The bed 1, is formed with a longitudinal channel 3, for catching and conducting into the pedestals 2 with which it communicates through openings 4, the water or other lubricating liquid employed to prevent the rubber or other material from sticking to and interfering with the operation of the cutter blade as hereinafter explained.

Fixed and movable work-clamping dogs 5 and 6, are mounted on the bed 1. The dog 6 is guided and movable towards and from the dog 5 on suitable ways provided therefor on the bed 1, and is shifted or adjusted thereon by means of a pinion 7, meshing with a rack 8 attached to the bed lengthwise thereof at one side of the channel 3. The pinion shaft, which is journaled in the dog 6, is provided at its outer end with a hand wheel or crank 9. A locking dog 11, pivotally mounted on the clamping dog 6, is adapted by engagement with the pinion 7, to hold the clamping dog in adjusted position. A weighted handle 12, fixed on the outer end of the pivot pin of the dog 11, serves to hold it in or out of engagement with the pinion and to shift it from one position to the other.

A hand lever 13, is loosely mounted on the shaft of the pinion 7 and provided with a clutch member engageable with a clutch member on the hub of the hand wheel or crank 9, for applying more power when desired to the operation of the dog 6.

A vertically swinging arm 14 is pivotally connected at one end with standards rising from one end of the bed 1. An inverted U-shaped reciprocatory yoke or cutter frame is guided on the arm 14 over the bed 1. A blade 16, is detachably connected with the lower ends of the downwardly extending arms of the yoke or frame 15, one of the blade fastenings being provided with an adjusting screw 17, for stretching and holding the blade taut. The blade is preferably formed with a scalloped or wavy cutting edge, as shown.

A fountain and spreader 19, is suspended from and carried by the arm 14 between the limbs of the cutter yoke or frame 15, by means of a flanged plate 20, bolted to the under side of the arm 14, which is of arched cross section.

The fountain and spreader, as shown in Figs. 1, 2, 6 and 7, which is bolted to a depending flange on the plate 20, consists of two thin parallel metal plates 22, riveted or screwed to spacing and closure members 23, 24, 25 and 26, which are of slightly greater thickness than the cutter blade 16. The members 23 and 24 close the space between the side plates 22 at the top and ends of the fountain and spreader, and with the diagonal member 26 and lower member 25, form a distributing chamber or conduit for supplying water or other lubricating liquid in thin sheets or films to the sides of the blade 16 adjacent its cutting edge.

As shown in Fig. 7, the members 24 terminate at their lower ends above the lower edges of the plates 22, which overlap and loosely embrace the blade 16 adjacent its back. The member 25 terminates at one end a short distance from the adjacent end member 24, and its lower edge is located a short distance above the lower ends of the end members 24 and above the back of the blade 16, to form a channel for the distribution of the water or other lubricating liquid which issues therefrom in thin sheets or films between the plates 22 and the sides of the blade. The diagonal or obliquely disposed member 26, extending from a point near the upper end of one of the end members 24 adjacent the inlet opening or liquid supply connection of the fountain downwardly to the opposite end of the member 25 and terminating a short distance from the other end member, directs the water or lubricating liquid to the opening into the distributing channel below the member 25. The lower edges of the plates 22 are beveled downwardly towards the sides of the blade 16 so as to more readily enter a cut made by the blade and spread or deflect the rubber or other material as it is cut, away from the sides of the blade, as illustrated in Fig. 6.

The lower portions of the plates 22 between which the blade 16 is guided, and which are subjected to wear, may be made separate from the upper portions, so that they may be made of a harder or different metal from the upper portions, and may be easily renewed.

The arm 14 and the cutter yoke or frame 15 and fountain and spreader 19, are counterbalanced or partially counterbalanced, to facilitate raising the blade 16 into position for starting a cut, by compression springs 29, mounted on rods 30, which are pivotally connected with said arm on opposite sides of its pivot axis, and are guided in lugs on the machine frame.

Reciprocatory movement is imparted to the cutter frame 15 and blade 16 by a crank shaft 32, mounted coaxially with the pivot bearings of the arm 14 on the standards at one end of the bed 1, and connected by a rod 33 with said frame.

The cutter frame 15 is provided at the end opposite the connecting rod 33 with a handle 35, to facilitate lifting it with the blade 16 into position for starting a cut. The crank shaft 32 is driven by a gear 37 mounted on one end thereof and meshing with a pinion 38 on a shaft 39 having bearings in the bed frame below and parallel with the shaft 32. The shaft 39 is provided with tight and loose pulleys 41 and 42, which are connected by a belt with a driving pulley on a countershaft or motor shaft. As shown in Figs. 1 and 2, the machine is provided with an electric motor 44, mounted on a bracket 45 attached to and extending upwardly from the standards on the bed frame with which the arm 14 is pivotally connected. A driving pulley 46 on the motor shaft, is connected by a shiftable belt with the tight or loose pulley 41 or 42 on the pinion shaft 39.

For starting and stopping the machine, a belt shifter 48, mounted on a bracket 49, is connected through a bell crank 50 and rod 51, with a hand lever 52. A spring 54, connecting the bell crank 50 with the bracket 49, tends to shift the belt to and retain it on the loose pulley 42. The lever 52 is fixed on a short shaft 56, mounted in a standard 57 on the bed 1, and is locked and releasably held in position for operating the machine by a detent 59, pivotally mounted on the standard 57 and engageable with a heel or projection 60 on the hub of the lever. A spring 61 tends to hold the detent 59 in engagement with the heel or projection 60. The lever 52 is provided with a spring retracted push rod 63, connected with a pivoted grip lever 64 for thrusting the detent 59 out of engagement with the heel or projection 60.

For feeding the fountain and spreader 19 with the blade 16, towards the work supporting bed 1, the machine is provided with the following mechanism:

A ratchet bar 66, longitudinally movable on a vertical guideway 67 attached to the bed 1, as shown in Figs. 1, 2, 3, 4 and 8, is connected by a link 68 with the swinging arm 14. A feed lever 70, fulcrumed in the standard 57, is provided at one end with a pivoted feeding pawl 71, engageable with the ratchet bar 66. The other end of the lever 70 is provided with a pivoted arm 72, having an adjustable yielding connection therewith, consisting of a bolt 73 and spring 74. The arm 72 is provided with a roller 76 arranged to cooperate with a cam 77 on the crank shaft 32, to intermittently move the pawl 71 downward. A spring 78, connecting the lever 70 with the bed 1, holds the roller 76 in engagement with the cam 77 and retracts the pawl 71 upward.

A holding pawl 80, is pivotally mounted in the standard 57 coaxially with the detent 59, and a spring 81 tends to hold it in engagement with the ratchet bar 66. A spring 82 tends to hold the feeding pawl 71 in engagement with said ratchet bar. A trip 84 fixed on the lever shaft 56, cooperates with tail pieces on the pawls 71 and 80 to throw and hold the pawls out of engagement with the ratchet bar when the controlling hand lever 52 is released and turned by the spring 54 into position, as shown in Fig. 1, to shift the driving belt upon the loose pulley 42 and thereby stop the machine.

Water or other liquid is supplied to the fountain 19 through a pipe 86 carried by the arm 14 and having a flexible section 87 and a shut-off valve 88. A pump 90 connected with one of the hollow pedestals 2 and driven by a belt from a pulley 91 on the crank shaft 32, is arranged to elevate the water or lubricating liquid through the pipe 86 into the fountain 19 from the pedestals 2, which are connected by a pipe 92, and form a reservoir into which the water or other liquid flows from the channel 3 in the bed 1, to be pumped into the fountain and used over and over again for the lubrication of the cutter blade.

A tappet 94, adjustably fastened to the link 68, is adapted by engagement with the detent 59 to release the lever 52 and thus permit the spring 54 to operate the belt shifter 48 and shift the belt upon the loose pulley 42, thereby stopping the machine when the blade 16 reaches the limit of its downward movement.

A rod or bar 96, pivoted to the bed 1 and extending upwardly therefrom, loosely through a flange or ear on the arm 14 and provided above the flange or ear with a spring 97 and at its upper end with an adjustable collar 98, serves as a cushion stop to limit the upward movement of said arm with the cutter frame, fountain and blade in proper position preparatory to making a cut.

In the operation of the machine, the arm 14 being swung upwardly against the stop collar 98 and held by the counterbalancing springs 29 in that position, a bale, bundle or mass of rubber or the like to be sliced or cut into pieces of the desired size, is placed on the bed 1 between the dogs 5 and 6. The dog 6 is then shifted towards the dog 5 to clamp and hold the bale, bundle or mass of material to be cut between them by means of the hand wheel or crank 9, the final adjustment of the movable dog to imbed the teeth of the dogs in the material, which requires greater power, being effected if necessary by the hand lever 13.

The material being properly positioned on the bed and clamped in place thereon by the dogs as above explained, the machine is started by throwing the hand lever 52, as shown in Fig. 1, to the right. This operates through the connecting rod 51, bell crank 50 and belt shifter 48, to carry the driving belt from the loose pulley 42 upon the tight pulley 41, and sets the crank shaft 32 in motion. Turning the lever 52 into operative position, as above stated, in which position it is automatically locked by the spring-actuated detent 59, shifts the trip 84 into position, as shown in Figs. 4 and 8, to release the pawls 71 and 80, which are thereupon thrown by the springs 81 and 82 into engagement with the ratchet bar 66.

The rotation of the crank shaft through the connection of its crank by the rod 33 with the cutter yoke or frame 15, imparts a reciprocatory movement to the blade 16, and the cam 77 engaging the roller 76, rocks the lever 70 and intermittently moves the feeding pawl 71 downward, the lever with the pawl being retracted by the spring 78 with each complete reciprocation of the cutter blade. With each downward movement of the pawl 71 the ratchet bar 66 is moved downward an interval, carrying the cutter frame and blade with it.

When the machine is started, the pump 90 is set in operation and forces water or other lubricating liquid from the reservoir in the pedestals 2 or frame base, through the pipe 86 into the fountain 19, from which it is distributed in thin sheets or films from the channel below the spacing member 25 to the sides of the blade, and as the blade makes a cut in the material, as shown in Fig. 6, the plates 22 of the fountain and spreader deflect the material away from the blade, while the water or other liquid supplied thereto under confinement to the point of discharge or delivery adjacent the cutting edge of the blade within the cut effectively prevents the rubber or the like from sticking to the blade and interfering with its operation.

The lubricating liquid supplied by the fountain 19 to the cutter blade and escaping from the cut made by the blade, is caught in the channel 3 of the bed 1, and flows therefrom through the openings 4 into the pedestals 2, from which it is pumped back into the fountain when the machine is in operation, to be used over and over again as long as it is in proper condition therefor.

The pedestals 2 are provided with hand holes and removable covers 100, for removing from time to time sediment and foreign matter which may accumulate therein.

With each reciprocation of the cutter blade the arm 14 with the cutter frame 15, blade 16 and fountain 19, is fed downward an interval by the feeding pawl 71.

In case the blade encounters an obstruction or resistance in the work which might otherwise injure the machine or cause excessive strain on any of its working parts, the arm 72 of the feeding lever 70 will yield against the tension of the spring 74 and thus avoid such injury or strain by arresting or retarding the downward feed of the blade.

When the blade has finished a cut the tappet 94 engaging with the detent 59, forces it downward against the tension of the spring 61 out of engagement with the heel 60 of the controlling lever 52, which is thus released. The spring 54 thereupon moves the belt shifter 48 outward, shifting the driving belt from the pulley 41 to the pulley 42, and stopping the machine. At the same time the spring 54 acting through the bell crank 50 and rod 51, throws the lever 52 into the position in which it is shown in Fig. 1, and with it the trip 84 into position to disengage the pawls 71 and 80 from the ratchet bar 66.

With the stopping of the crank shaft 32 which actuates the cutter frame and blade, the pump 90 is also stopped, and the supply of water or lubricating liquid to the fountain 19 is cut off.

The arm 14 with the cutter frame and blade and the fountain and spreader carried thereby, is then free to be raised by the operator into position for making another cut, as hereinbefore explained.

Various changes in the construction and arrangement of parts may be made to adapt the machine to varying conditions and different kinds or grades of material, without essentially changing its principle and mode of operation and without departure from the invention as defined in the following claims.

I claim:

1. In a machine for cutting rubber and the like, the combination of a cutting blade and means for continuously conducting under confinement a lubricating liquid and delivering it to the blade adjacent its cutting edge within a cut.

2. In a machine for cutting rubber and the like, the combination of a cutting blade, means for spreading the material as it is being cut away from the blade and means for continuously supplying a lubricating liquid to the blade within the cut as it is being made by the blade.

3. In a machine for cutting rubber and the like, the combination of a cutting blade, a holder for the material to be cut, means for causing relative movement between the holder and blade, and means for continuously conducting under confinement a lubricating liquid and delivering it to the blade adjacent its cutting edge within a cut.

4. In a machine for cutting rubber and the like, the combination of a cutting blade and work holder one of which is movable relatively to the other, a spreader adapted to deflect the material as it is cut away from the blade, and means for supplying a lubricating liquid to the cut.

5. In a machine for cutting rubber and the like, the combination of a reciprocating cutting blade and a work holder one of which is movable towards and from the other, means for imparting a reciprocating movement to the blade, and a spreader and fountain adapted to deflect the material, as it is cut, away from the blade and to supply a lubricating liquid thereto.

6. In a machine for cutting rubber and the like, the combination of a pivotally mounted supporting arm, a reciprocatory cutter frame guided on the arm, a blade carried by the frame, a fountain carried by said arm and adapted to supply a lubricating liquid to the blade, and means for imparting reciprocatory movement to the cutter frame and blade.

7. In a machine for cutting rubber and the like, the combination of a work holder, a pivoted arm movable towards and from the work holder, a reciprocatory cutter frame guided on said arm and provided with a blade, means for imparting reciprocatory movement to the cutter frame and blade, a fountain carried by said arm and adapted to deliver a lubricating liquid to the blade, and means for feeding the arm with the cutter frame, blade and fountain towards the work holder.

8. In a machine for cutting rubber and the like, the combination of a work supporting bed carried by a hollow pedestal and formed with a longitudinal channel opening into the pedestal, a vertically swinging arm pivotally connected at one end with the bed, a reciprocatory cutter frame guided on said arm and provided with a blade, means for imparting a reciprocatory movement to the cutter frame and blade, a fountain carried by said arm and adapted to deliver a lubricating liquid to the blade, means for feeding the arm with the cutter frame, blade and fountain towards the bed, and a pump for elevating the lubricating liquid from the pedestal into the fountain.

9. In a machine for cutting rubber and the like, the combination of a work supporting bed, a vertically swinging arm pivotally connected at one end with the bed, a reciprocatory cutter frame guided on said arm and provided with a blade, a fountain carried by said arm and adapted to deliver a lubricating liquid to the blade, means for supplying the lubricating liquid to the fountain, means for counterbalancing the swinging arm and the parts carried thereby, and means for imparting a reciprocatory movement to the cutter frame and blade.

10. In a machine for cutting rubber and the like, the combination of a frame, a vertically swinging arm pivotally connected with the frame, a reciprocatory cutter frame guided on said arm and provided with a blade, means for imparting a reciprocatory movement to the cutter frame and blade, a fountain carried by said arm and adapted to deliver a lubricating liquid to the blade, and means for feeding said arm with the cutter frame, blade and fountain towards the work, comprising a ratchet bar guided on the frame and connected with said arm, feeding and holding pawls arranged to cooperate with the ratchet bar, a lever with which the feeding pawl is pivotally connected, and a cam for rocking said lever.

11. In a machine for cutting rubber and the like, the combination of a work supporting frame and bed, a vertically swinging arm pivotally connected with the frame, a reciprocatory cutter frame guided on said arm and provided with a blade, means for imparting reciprocatory movement to the cutter frame and blade, a fountain carried by said arm and adapted to deliver a lubricating liquid to the blade, and means for feeding the arm with the cutter frame, blade and fountain towards the bed, comprising a ratchet bar guided on the frame and connected with said arm, feeding and holding pawls arranged to engage with the ratchet bar, a lever with which the feeding pawl is pivotally connected, a cam for rocking said lever, and a trip for throwing and holding the pawls out of engagement with the ratchet bar.

12. In a machine for cutting rubber and the like, the combination of a frame, a vertically swinging arm pivotally connected with the frame, a reciprocatory cutter frame guided on said arm and provided with a blade, means for imparting reciprocatory movement to the cutter frame and blade, means for delivering a lubricating liquid to the blade, and feeding means comprising a ratchet bar guided on the frame and connected with said arm, a movable pawl arranged to engage with said ratchet bar, and a yielding actuating connection for operating the pawl.

13. In a machine for cutting rubber and the like, the combination of a frame, a vertically swinging arm pivotally connected with the frame, a reciprocatory cutter frame guided on said arm and provided with a blade, a crank connected with the cutter frame for imparting reciprocatory movement to the blade, means for feeding said arm with the cutter frame and blade towards the work, comprising a ratchet bar guided on the main frame and connected with said arm, a cam on the crank shaft, a pawl arranged to cooperate with the ratchet bar, and a jointed lever with which the pawl is connected, adapted to be rocked by the cam and having a yielding element between the cam and pawl.

14. In a machine for cutting rubber and the like, the combination of a main frame, an arm pivotally connected with the frame, a reciprocatory cutter frame guided on the arm and provided with a blade, a shaft provided with a crank connected with the cutter frame for imparting a reciprocatory movement to the blade, feeding mechanism comprising a ratchet bar guided on the main frame and connected with said arm, pivoted feeding and holding pawls adapted to cooperate with the ratchet bar, means for imparting a reciprocatory movement to the feeding pawl, a lever for manually controlling the operation of the machine, means tending to shift the controlling lever into position to stop the machine, a yielding detent for holding the controlling lever in position to operate the machine, a trip connected with the controlling lever for throwing the pawls out of engagement with the ratchet bar when the machine is stopped, and a member connected with said arm and adapted to disengage the detent and release the controlling lever at a certain point in the advance movement of the cutter blade.

15. In a machine for cutting rubber and the like, the combination of a swinging arm, a reciprocatory cutter frame guided on said arm and provided with a blade, means for imparting reciprocatory movement to the blade, and a fountain attached to said arm and comprising thin parallel plates loosely embracing the back of the blade and forming with marginal spacing and closure members a chamber for supplying a lubricating liquid in films to the sides of the blade adjacent its cutting edge.

16. In a machine for cutting rubber and the like, the combination of a work supporting bed, fixed and movable work clamping dogs mounted on the bed, means for shifting the movable dog towards and from the fixed dog, a pivotally mounted arm movable towards and from the bed, a reciprocatory cutter frame guided on said arm and provided with a blade, and means for imparting reciprocatory movement to the cutter frame and blade.

17. In a machine for cutting rubber and the like, the combination of a work supporting bed, fixed and movable work clamping dogs mounted on the bed and each comprising two sections spaced from each other, means for shifting the movable dog towards and from the fixed dog, a swinging arm, a reciprocatory cutter frame guided on said arm and provided with a blade movable therewith towards and from the bed in the spaces between the dog sections, and means for imparting reciprocatory movement to the cutter frame and blade.

18. In a machine for cutting rubber and the like, the combination of a work supporting bed, fixed and movable work clamping dogs mounted on the bed, a rack and pinion for shifting the movable dog towards and from the fixed dog, a dog adapted by engagement with the pinion to lock the movable dog in adjusted position, a swinging arm, a reciprocatory cutter frame provided with a blade and guided on said arm with which it is movable towards and from the bed, and means for imparting reciprocatory movement to the cutter frame and blade.

19. In a machine for cutting rubber and the like, the combination of a main frame and work support, a swinging arm pivotally connected at one end with the frame and movable towards and from the work support, a reciprocatory cutter frame guided on said arm and provided with a blade, a shaft coaxial with the pivot axis of the swinging arm and having a crank connected with the cutter frame, mechanism for swinging said arm with the cutter frame and blade towards the work support, comprising a ratchet bar and feeding and holding pawls, a lever for manually starting and stopping the machine and for shifting the pawls out of engagement with the ratchet bar when the machine is stopped, means tending to shift the lever into position for stopping the machine, a detent for holding the lever in position for operation of the machine, and a tappet movable with the ratchet bar and adapted to disengaged the detent and release the lever when the cutter blade reaches a certain point in its approach towards the work support.

20. In a machine for cutting rubber and the like, the combination of a work supporting bed formed with a longitudinal channel, a hollow pedestal on which said bed is mounted and into which the channel in the bed opens; fixed and movable work clamping dogs mounted on said bed, means for adjusting the movable dog towards and from the fixed dog, a vertically swinging arm pivotally connected at one end with the bed, a reciprocatory cutter frame guided on said arm and provided with a blade which is movable towards and from the bed over the channel therein, means for imparting reciprocatory movement to the cutter frame and blade, a fountain and spreader mounted on and movable with said swinging arm and comprising parallel plates overlapping the sides of the blade adjacent its back and adapted to supply a lubricating liquid thereto in thin sheets, and a pump for elevating the lubricating liquid from the pedestal into the fountain.

In witness whereof I hereto affix my signature.

CHARLES RASMUSSEN.